United States Patent [19]

Botts

[11] 4,284,361

[45] Aug. 18, 1981

[54] EGG FLUFFER

[76] Inventor: William M. Botts, P.O. Box 663, Bellevue, Wash. 98009

[21] Appl. No.: 148,262

[22] Filed: May 9, 1980

[51] Int. Cl.³ .......................................... B01F 13/00
[52] U.S. Cl. ................................................... 366/343
[58] Field of Search ............... 366/343, 342, 344, 241, 366/244, 246, 247, 249, 297; 416/227 R, 241 R

[56] References Cited

U.S. PATENT DOCUMENTS

| 75,787 | 3/1868 | Peirce | 366/343 |
|---|---|---|---|
| 1,282,265 | 10/1918 | Merritt . | |
| 1,385,802 | 7/1921 | St. John . | |
| 2,382,273 | 8/1945 | Thielemann | 75/125 |
| 2,753,160 | 7/1956 | Gunn | 366/343 |
| 3,328,005 | 6/1967 | McMaster . | |
| 3,330,539 | 7/1967 | Lurski . | |

Primary Examiner—Edward J. McCarthy
Attorney, Agent, or Firm—Dowrey & Cross

[57] ABSTRACT

An egg fluffer having mixer blades with copper surfaces thereon for interacting with egg white albumen in whipping processes to produce high-volume, stable foams.

5 Claims, 2 Drawing Figures

EGG FLUFFER

BACKGROUND OF THE INVENTION

1. Field of the Invention

This invention relates generally to apparatus for whipping albumen to form a stable foam. More particularly, the present invention relates to beaters for whipping egg whites.

2. Description of the Prior Art

Contact between copper and egg white albumen greatly enhances the process of beating egg whites to produce the high-volume, stable foams which are desirable for meringues, pies, cakes, etc. It has been theorized that copper ions interact with albumen to facilitate incorporation of air into the foam produced by whipping the egg whites.

Prior art processes for beating egg whites in the presence of copper usually include placing the egg whites in a copper bowl, followed by beating or whipping the egg whites with a conventional mixer or beater. Copper bowls are expensive, inconvenient to store, and awkward to use with many conventional mixers. Therefore, there is a need in the art for an inexpensive, convenient and efficient means for providing the necessary contact between egg white albumen and copper which is essential to efficiently whip egg whites.

SUMMARY OF THE INVENTION

The present invention overcomes the expense and inconvenience associated with using conventional methods for whipping egg whites. The invention provides egg beaters incorporating layers of copper thereon for supplying trace amounts of copper to egg white albumen during the whipping process, which the present invention efficiently accomplishes in an ordinary container, such as is commonly supplied with most mixers or blenders for household use.

The present invention effects vigorous contact of exposed copper metal with egg white albumen at a larger interface than does the process of whipping egg whites in a copper bowl, wherein only the albumen in contact with the surface of the bowl interacts with the copper metal. Therefore, an egg beater according to the present invention permits the use of ordinary containers in the production of a foam of albumen having greater volume and improved consistency than that obtained by placing egg whites in a copper bowl and beating the egg whites with an ordinary beater.

DESCRIPTION OF THE PREFERRED EMBODIMENT

Figure 1:
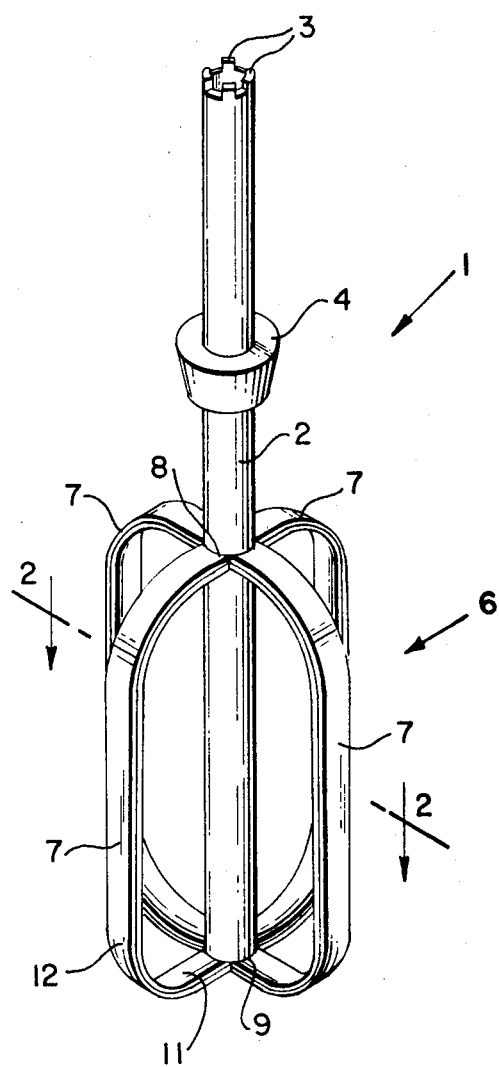
FIG. 1 is a perspective view of an egg fluffer according to the invention.

Referring to FIG. 1, an egg fluffer 1 according to the present invention includes a shaft 2 having a first end thereof configured to fit in a conventional mixer chuck (not shown). The shaft 2 may include a plurality of projections 3 which provide a means for engaging the shaft 2 with the mixer chuck to permit the mixer chuck to rotate the shaft 2. The shaft 2 may also include a flange 4 thereon for limiting the depth of penetration of the shaft 2 in the mixer chuck.

An egg fluffer according to the present invention has a mixer section 6 including a plurality of mixer blades 7 which have first ends 8 extending outward from the shaft 2; and the mixer blades 7 are normally configured such that the second ends 9 thereof are connected together. The shaft 2 may extend between the first and second ends of the blades 7 to provide strength and stability to the structure. The shaft 2 and the mixer blades 7 may be conveniently formed of a metal or a suitable plastic material of sufficient durability.

Figure 2:
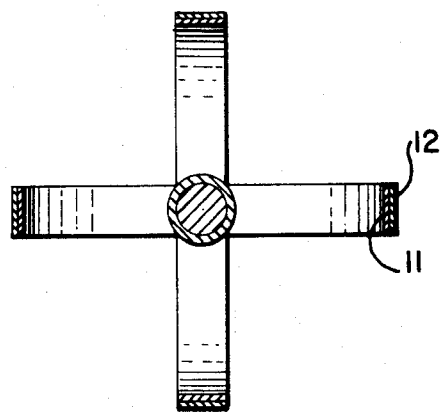
FIG. 2 is a cross-sectional view taken along line 2—2 of FIG. 1.

Referring to FIGS. 1 and 2, the mixer blades 7 include an inner layer 11 of copper metal attached by any suitable means to an outer layer 12. In an embodiment of the invention wherein the outer layer 12 is a metal, such as stainless steel, the inner layer 11 may be clad to the inner surface of the outer layer 12; or the inner layer 11 may be electroplated, riveted or bonded with a suitable adhesive to the outer layer 12.

Some mixer blades 7 are formed of plastic; and an embodiment of the invention includes strips of copper connected to the inner surfaces of such plastic mixer blades by a suitable means, such as adhesive bonding or rivets.

An egg fluffer according to the invention may include layers of copper attached to surfaces of the blades 7 other than, or in addition to, the inner surfaces of the blades 7. However, since copper is a relatively soft metal, the copper on the inner surfaces of the blades 7 is less susceptible to wearing off than is copper on other surfaces of the blades 7.

To use the invention to whip egg whites, one engages the shaft 2 in the mixer chuck, places egg whites in a conventional glass or stainless steel mixing bowl, and whips the egg whites in the customary manner. Using an egg fluffer according to the present invention effects sufficient contact of exposed copper metal with egg white albumen to produce high-volume, stable foams, such as those obtained when egg whites are whipped in a copper bowl with conventional mixer blades. Although optimum results are obtained using two egg fluffers according to the present invention to whip egg white albumen, satisfactory results may be obtained usng a single egg fluffer according to the invention in a mixer along with a conventional metal or plastic mixer blade. Therefore, using the present invention permits one to easily obtain optimum results in whipping egg whites without resorting to the use of an expensive copper bowl.

Although the present invention has been described with reference to a particular embodiment thereof, it will be understood by those skilled in the art that modifications may be made without departing from the scope of the invention. Accordingly, all modifications and equivalents which are properly within the scope of the appended claims are included in the present invention.

What is claimed is:

1. In combination with an egg albumen mixer for moving through a body of egg albumen, means forming an exposed copper surface on said egg albumen mixer, said exposed copper surface being positioned to contact the egg albumen as said egg albumen mixer moves therethrough.

2. Apparatus according to claim 1 including a mixer section, said mixer section including at least one mixer blade having an exposed copper surface thereon; and means for connecting said mixer section to a mixer chuck for rotating said mixer section through egg albumen.

3. Apparatus according to claim 2 wherein said exposed copper surface is located so as to avoid contact between said exposed copper surface and a mixing vessel containing egg albumen.

4. Apparatus according to claim 3 wherein said mixer section includes at least one mixer blade having an inner surface with said means forming an exposed copper surface positioned on said inner surface.

5. A method for fluffing egg albumen comprising holding egg albumen in a container; and agitating the egg albumen with a mixer element having an exposed copper metal surface thereon.

* * * * *